United States Patent
Kim et al.

(10) Patent No.: US 11,093,184 B2
(45) Date of Patent: Aug. 17, 2021

(54) INSTALLATION OF APPLICATION BASED ON PLATFORM

(71) Applicant: Hewlett-Packard Development Company, L.P., Spring, TX (US)

(72) Inventors: Jung Hun Kim, Seongnam-si (KR); Hyeong Bae Yu, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/636,993

(22) PCT Filed: Jun. 20, 2018

(86) PCT No.: PCT/KR2018/006936
§ 371 (c)(1),
(2) Date: Feb. 6, 2020

(87) PCT Pub. No.: WO2019/066198
PCT Pub. Date: Apr. 4, 2019

(65) Prior Publication Data
US 2020/0201580 A1    Jun. 25, 2020

(30) Foreign Application Priority Data

Sep. 29, 2017  (KR) .......................... 10-2017-0128310

(51) Int. Cl.
*G06F 8/61* (2018.01)
*H04N 1/00* (2006.01)
(Continued)

(52) U.S. Cl.
CPC ............ *G06F 3/123* (2013.01); *G06F 3/1203* (2013.01); *H04L 67/34* (2013.01); *H04N 1/00962* (2013.01)

(58) Field of Classification Search
CPC ...... G06F 3/1203; G06F 3/123; G06F 3/1285; G06F 3/1293; G06F 8/61; H04N 1/00938;
(Continued)

(56) References Cited

U.S. PATENT DOCUMENTS

2002/0002604 A1*  1/2002  Nomura ................. H04L 29/06
                                                            709/219
2008/0244057 A1*  10/2008 Kojima ..................... G06F 8/61
                                                            709/223
(Continued)

FOREIGN PATENT DOCUMENTS

KR    10-2013-0022495 A    3/2013
KR    10-2016-0091663 A    8/2016
WO    WO-2014066630 A2    5/2014

*Primary Examiner* — Chad Dickerson
(74) *Attorney, Agent, or Firm* — Jefferson IP Law, LLP

(57) ABSTRACT

An image forming apparatus that supports a plurality of platforms is provided. The image forming apparatus determines one or more platforms currently executable in the image forming apparatus from among the plurality of platforms. The image forming apparatus transmits, to an application server, a request for information of one or more applications executable on the determined one or more platforms and receives, from the application server, an application list including the information of the one or more applications. The image forming apparatus determines one or more applications to be installed on the one or more platforms, based on the application list, and downloads, from the application server, installation files of the one or more applications to be installed. The image forming apparatus installs each of the installation files on an executable platform from among the one or more platforms.

18 Claims, 16 Drawing Sheets

(51) Int. Cl.
*G06F 3/12* (2006.01)
*H04L 29/08* (2006.01)

(58) Field of Classification Search
CPC ............... H04N 1/00962; H04N 9/445; H04N 9/00941; H04N 2201/0046; H04L 67/34
USPC ........ 358/1.11–1.18; 709/201–203, 219, 223
See application file for complete search history.

(56) References Cited

U.S. PATENT DOCUMENTS

| | | |
|---|---|---|
| 2009/0164986 A1 | 6/2009 | Lee et al. |
| 2010/0212026 A1* | 8/2010 | Yoshimura ............... H04L 67/34 726/29 |
| 2011/0149322 A1 | 6/2011 | Byun et al. |
| 2012/0110315 A1 | 5/2012 | Lee |
| 2013/0027743 A1* | 1/2013 | Enami ................. H04N 1/00938 358/1.15 |
| 2013/0139075 A1* | 5/2013 | Park ........................ G06F 9/445 715/762 |
| 2013/0254024 A1 | 9/2013 | Woods et al. |
| 2014/0372518 A1 | 12/2014 | Moore et al. |
| 2015/0120807 A1 | 4/2015 | Bharadwaj |
| 2016/0196130 A1* | 7/2016 | Shimizu .................... G06F 8/65 717/168 |
| 2017/0223500 A1* | 8/2017 | Saitoh ................... H04L 63/107 |
| 2018/0341434 A1* | 11/2018 | Han ...................... G06F 3/1225 |
| 2019/0073205 A1* | 3/2019 | Matsui ................... H04L 67/34 |
| 2021/0067655 A1* | 3/2021 | Yoon ....................... H04L 67/10 |

\* cited by examiner

[Fig. 1]
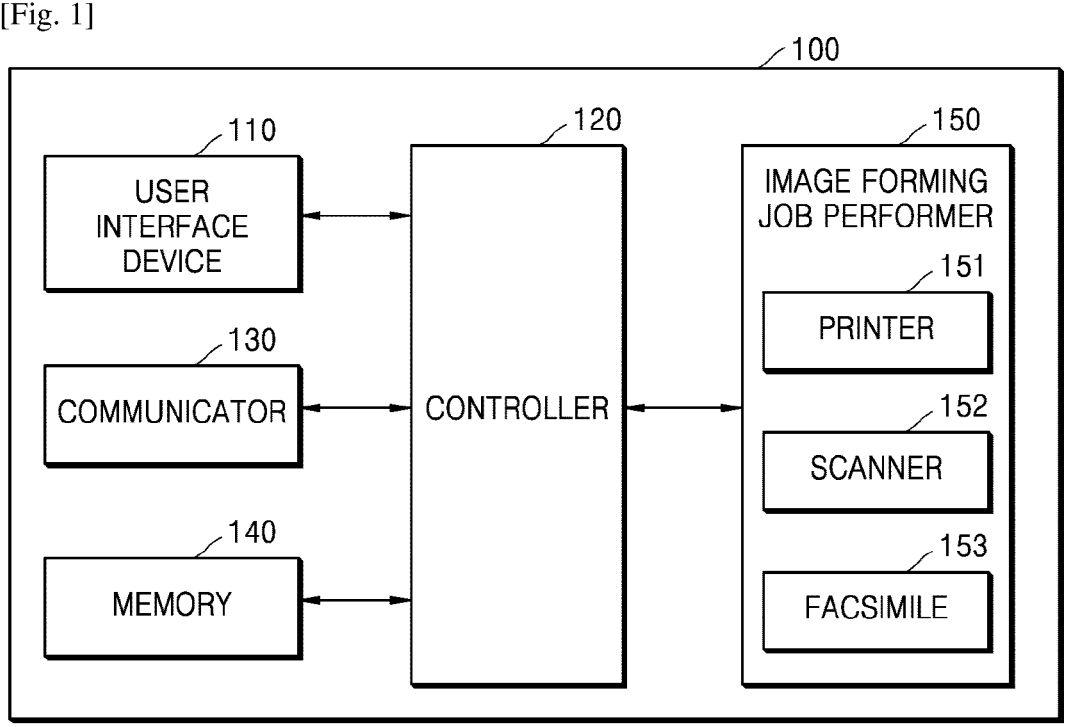

[Fig. 2]
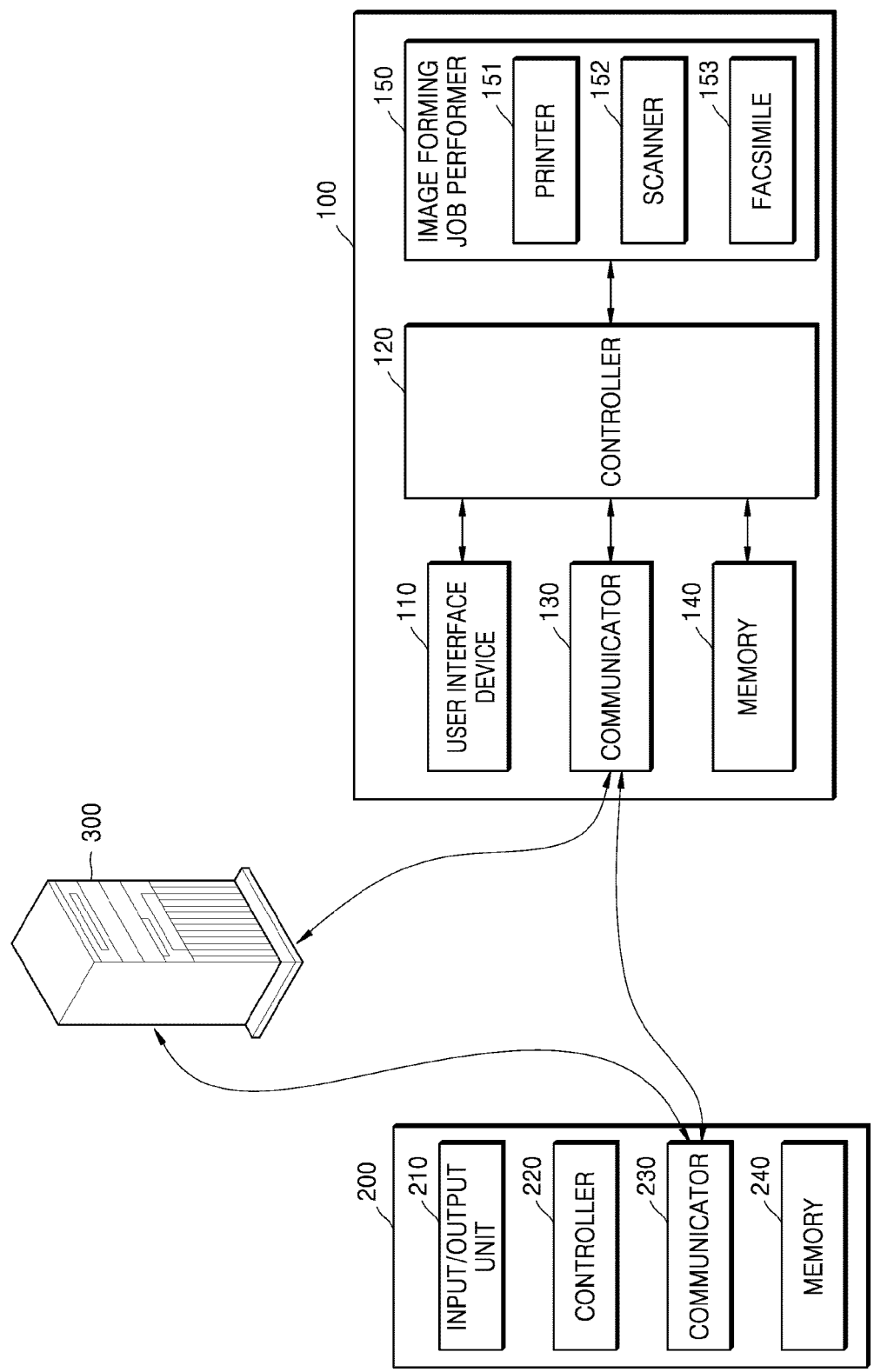

[Fig. 3]
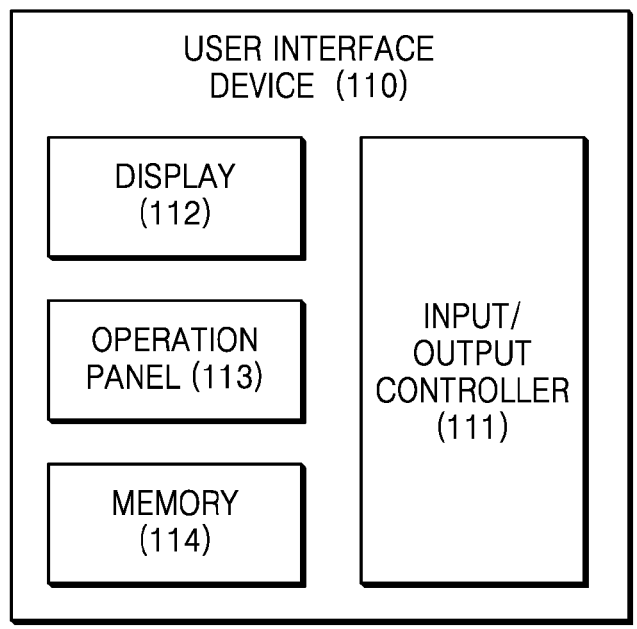

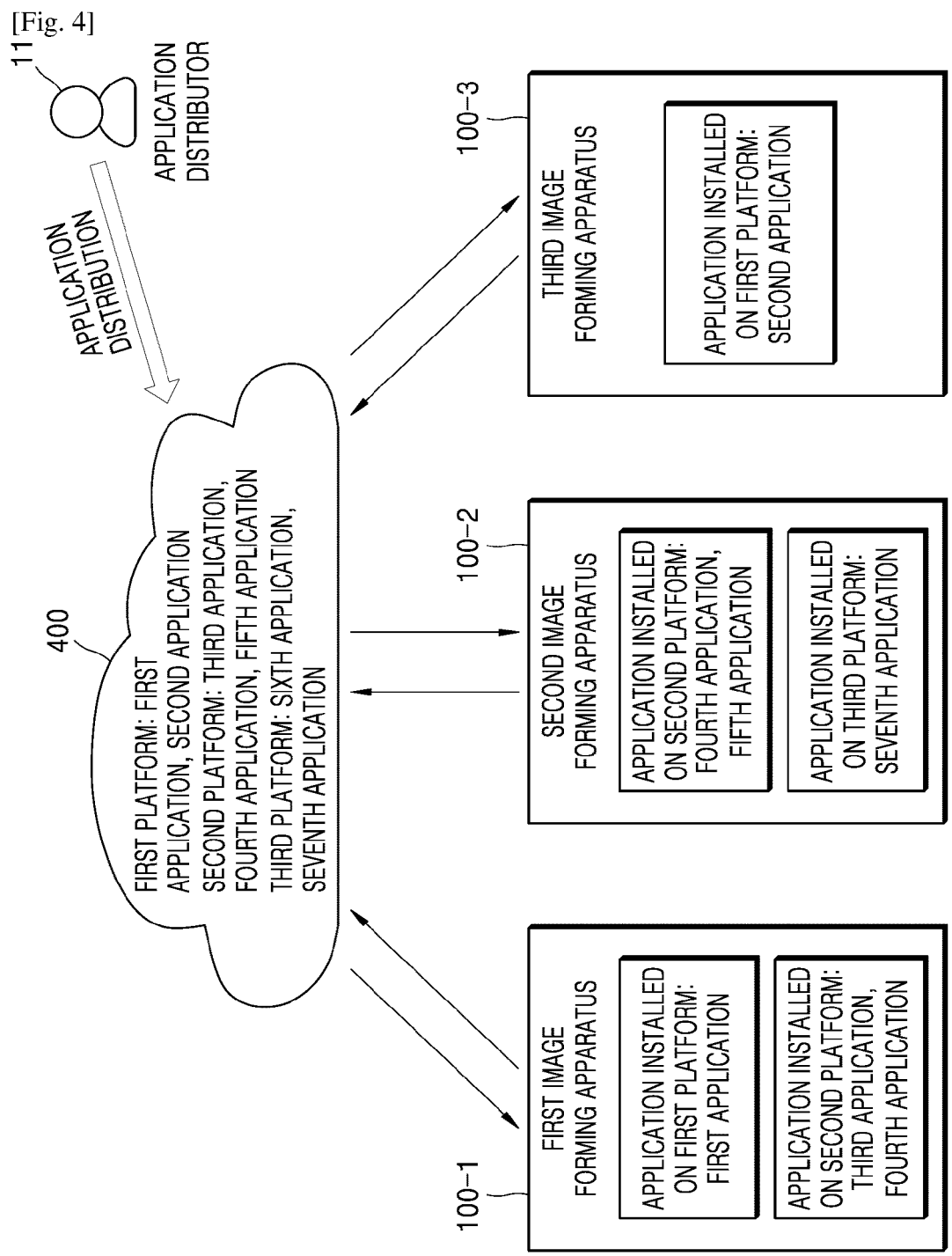

[Fig. 5]
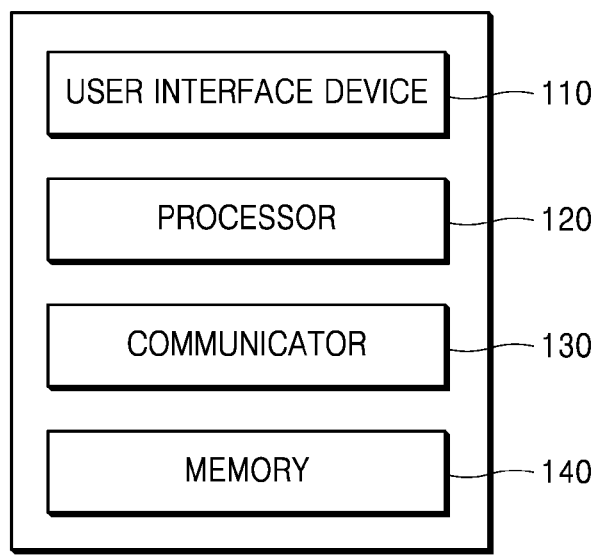

[Fig. 6]
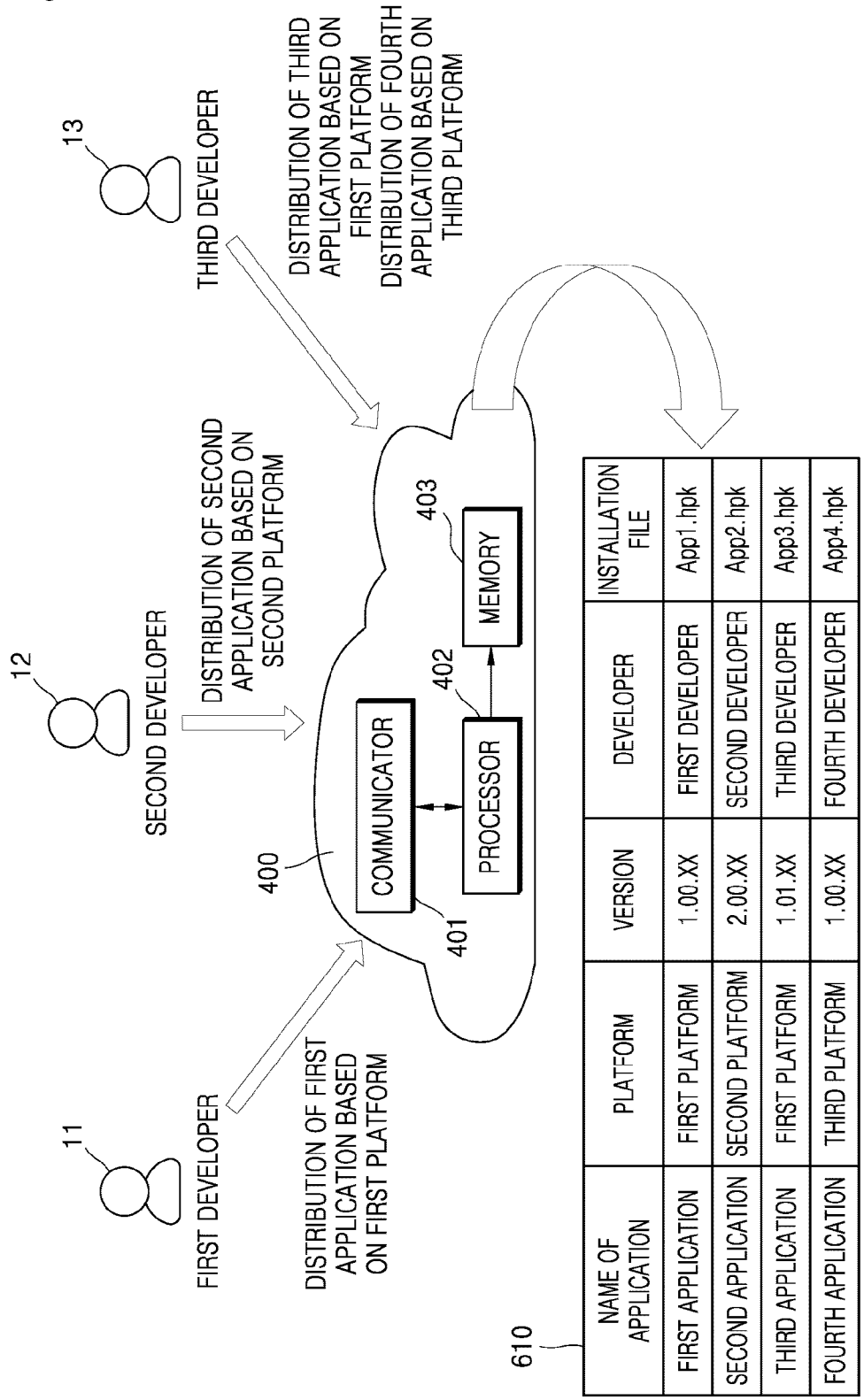

App.hpk
App.xml
```
<?xml version="1.0" encoding="UTF-8"?>
<app>
    <name>App</name>
    <version>1.0.0</version>
    <vendorName>A Company</vendorName>
    <date>20170206</date>
    <platformType>Android</platformType>
    <installFile>App.apk</installFile>
</app>
```
App.apk
<App INSTALLATION DATA>

720

App.hpk
App.xml
```
<?xml version="1.0" encoding="UTF-8"?>
<app>
    <name>App</name>
    <version>1.0.0</version>
    <vendorName>A Company</vendorName>
    <date>20170206</date>
    <platformType>OXPd</platformType>
    <installFile>App.xml</installFile>
</app>
```
App.xml
<App INSTALLATION DATA>

[Fig. 8]
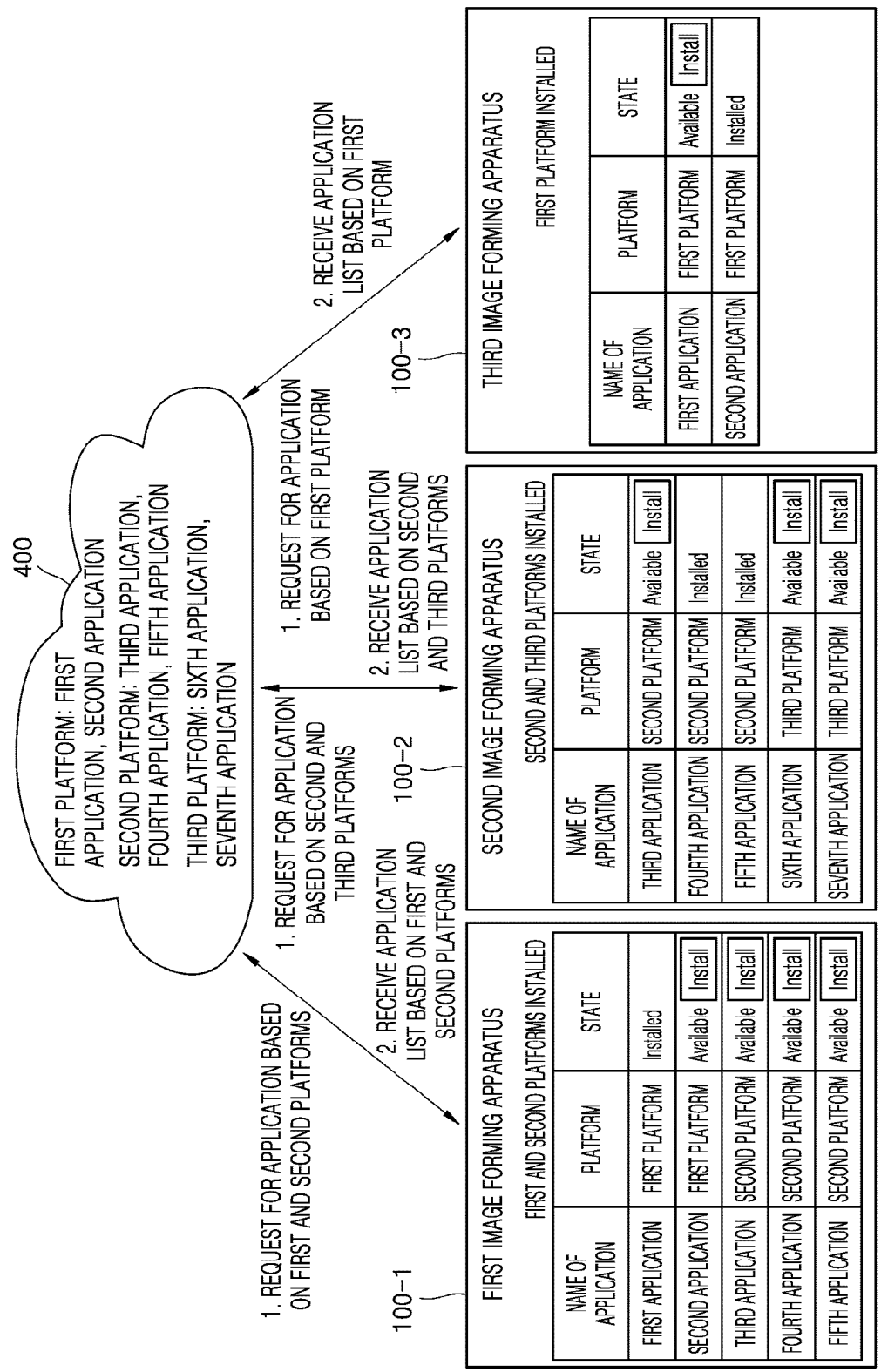

[Fig. 9]
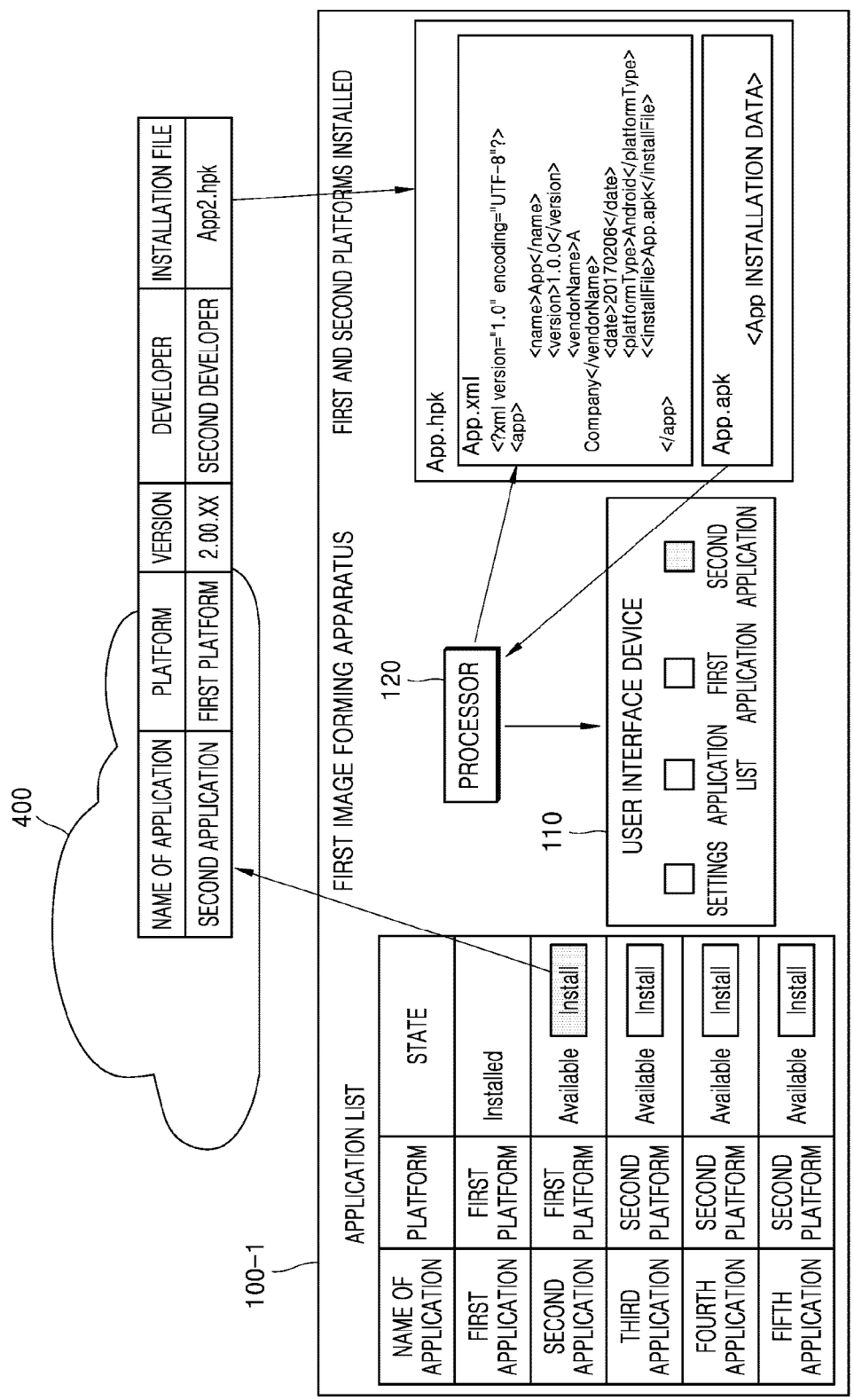

[Fig. 10]
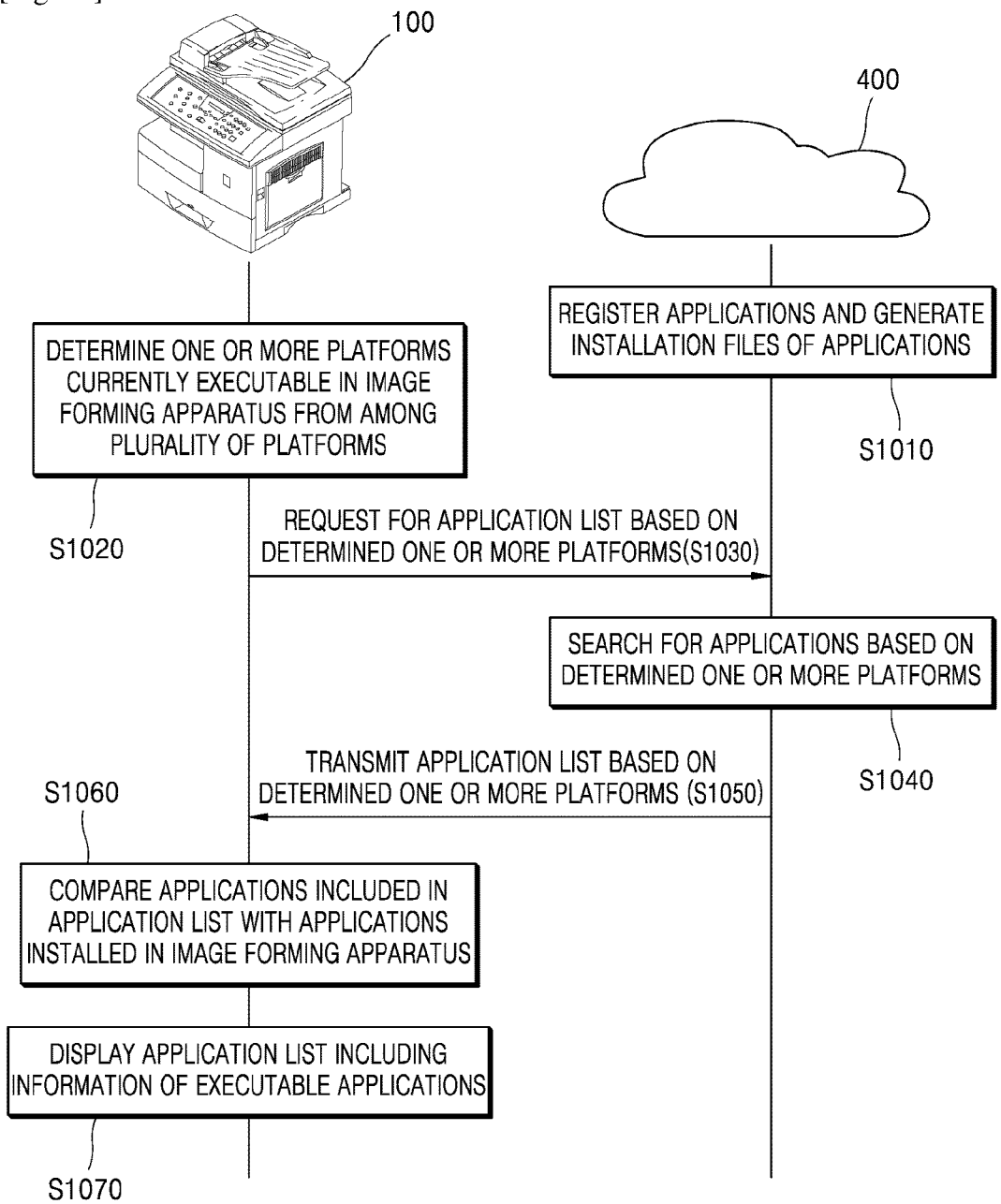

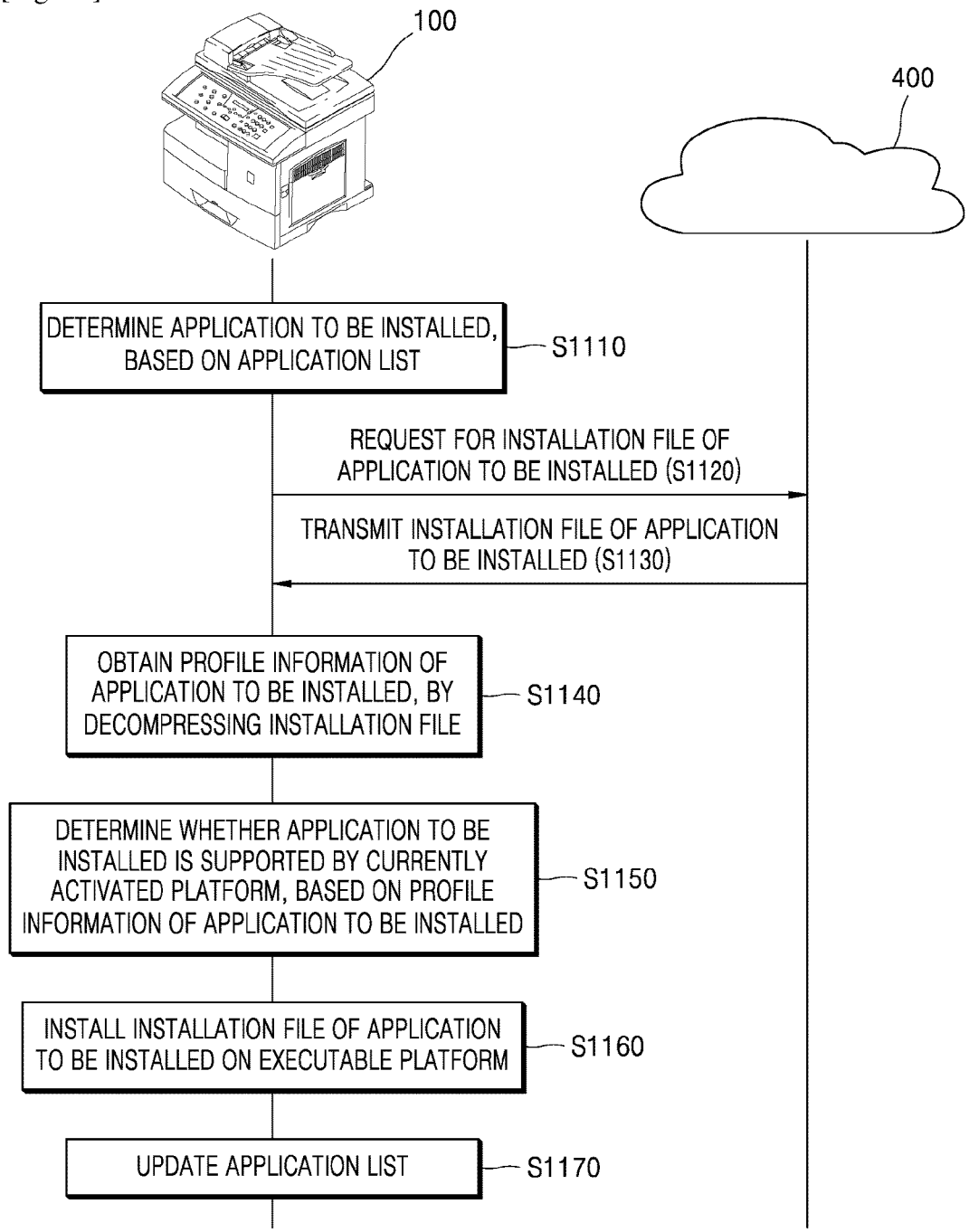

[Fig. 12]
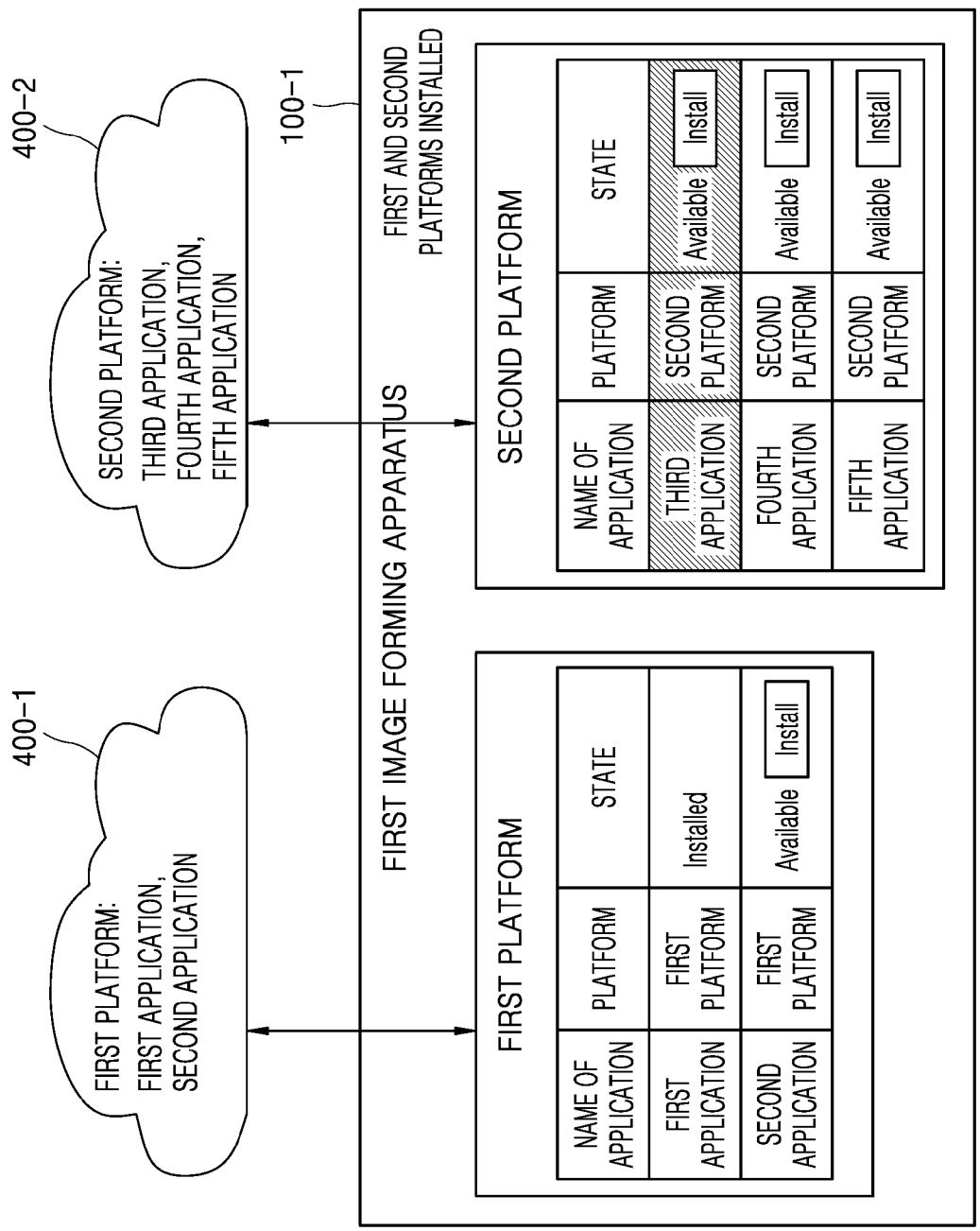

[Fig. 13]
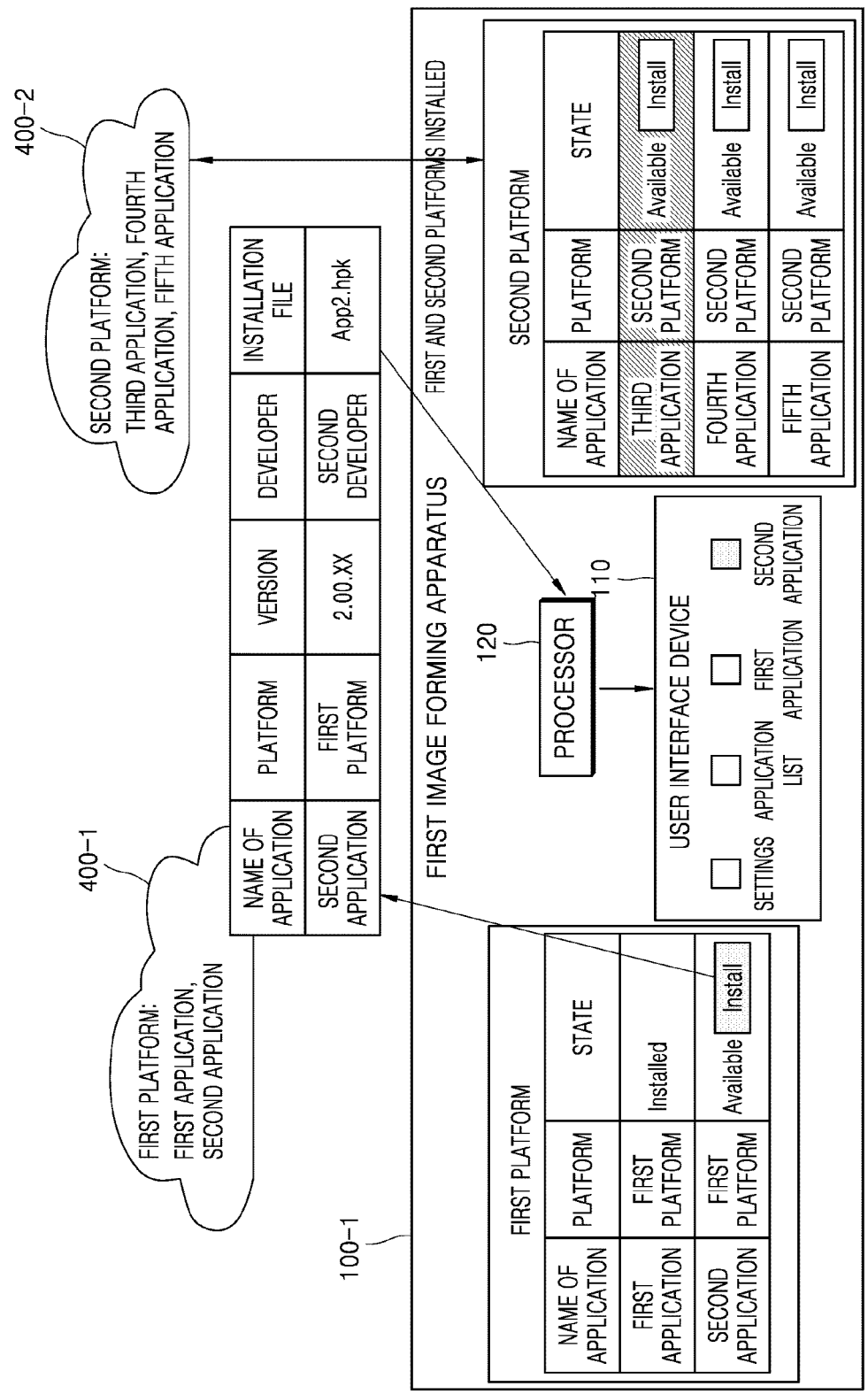

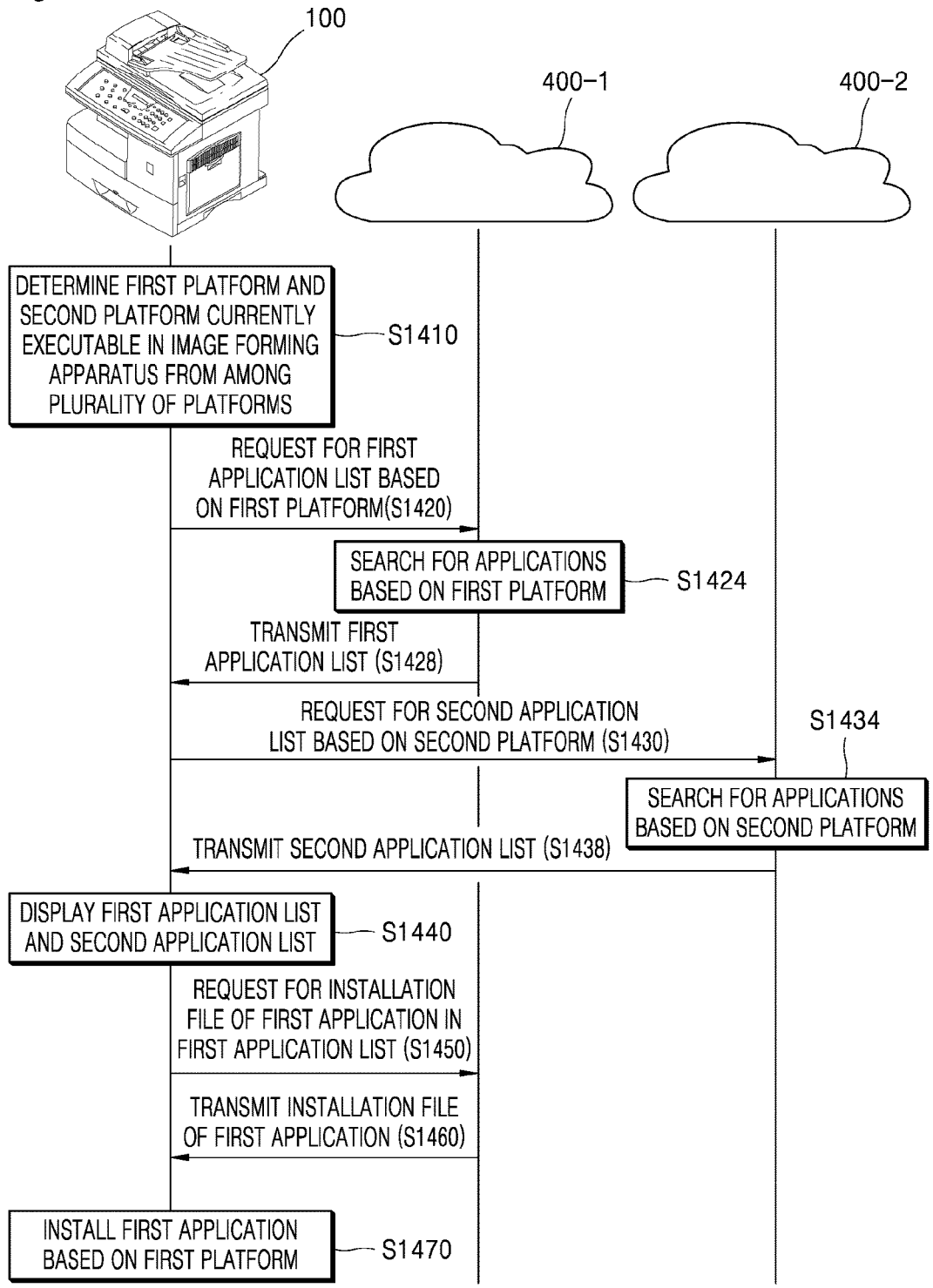

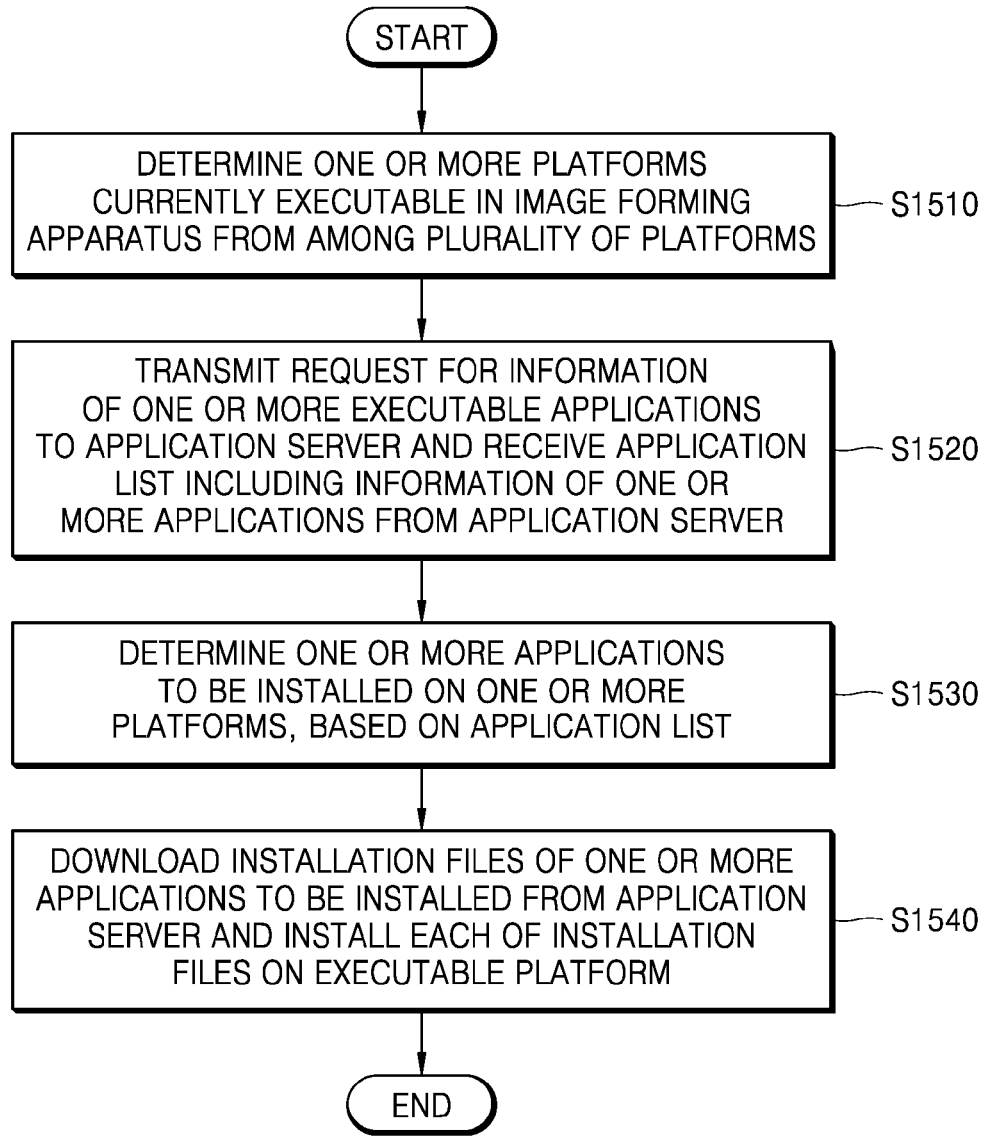
[Fig. 15]

[Fig. 16]
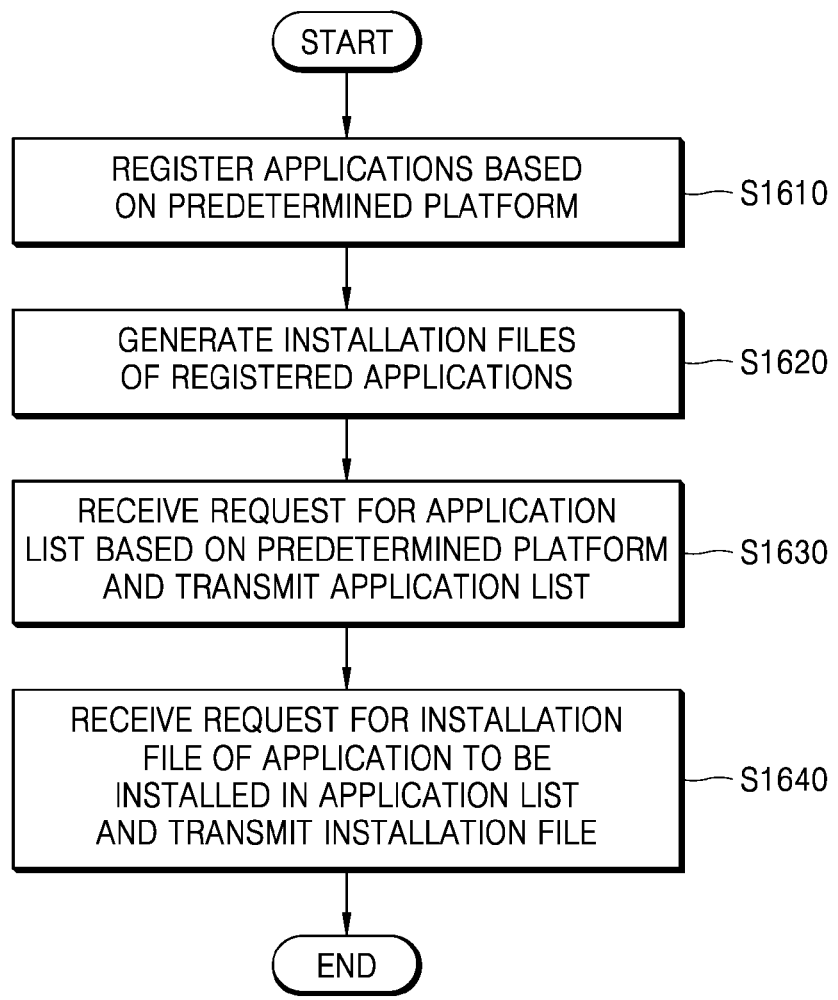

INSTALLATION OF APPLICATION BASED ON PLATFORM

BACKGROUND ART

An image forming apparatus may access a server that distributes applications, may download a desired application from the server, and may install the downloaded application in the image forming apparatus. In this case, a platform for running the application in the image forming apparatus is used.

BRIEF DESCRIPTION OF DRAWINGS

Examples of the present disclosure will become apparent and more readily appreciated from the following description, taken in conjunction with the accompanying drawings wherein like reference numerals denote like structural elements and in which:

FIG. 1 is a block diagram illustrating a configuration of an image forming apparatus according to an example;

FIG. 2 is a block diagram illustrating a state in which an image forming apparatus is connected to a user terminal or a server, according to an example;

FIG. 3 is a block diagram illustrating a configuration of a user interface device according to an example;

FIG. 4 is a conceptual diagram for explaining a process by which an image forming apparatus that supports a plurality of platforms downloads an application executable on the plurality of platforms from an application server and installs the application, according to an example;

FIG. 5 is a block diagram illustrating a configuration of an image forming apparatus that supports a plurality of platforms, according to an example;

FIG. 6 is a diagram for explaining a process by which an application developer registers applications on an application server, according to an example;

FIG. 7 is a diagram for explaining an installation file of an application to be installed in an image forming apparatus, according to an example;

FIG. 8 is a diagram for explaining a process by which image forming apparatuses that support a plurality of platforms request an application server for an application list based on one or more platforms that are currently executable and receive the application list from the application server, according to an example;

FIG. 9 is a diagram for explaining a process by which an image forming apparatus that supports a plurality of platforms determines an application to be installed in an application list and installs the application in the image forming apparatus, according to an example;

FIG. 10 is a diagram for explaining a process by which an image forming apparatus that supports a plurality of platforms obtains and displays an application list installable on one or more platforms that are currently executable, according to an example;

FIG. 11 is a diagram for explaining a process by which an image forming apparatus that supports a plurality of platforms determines an application to be installed and installs the application, based on an application list, according to an example;

FIG. 12 is a diagram for explaining a process by which an image forming apparatus that supports a plurality of platforms requests a plurality of application servers, which distribute applications based on different platforms, for an application list based on one or more platforms that are currently executable and receives the application list from the plurality of application servers, according to an example;

FIG. 13 is a diagram for explaining a process by which an image forming apparatus that supports a plurality of platforms determines an application to be installed in an application list and installs the application in the image forming apparatus, by using a plurality of application servers that distribute applications based on different platforms, according to an example;

FIG. 14 is a diagram for explaining a process by which an image forming apparatus that supports a plurality of platforms installs applications installable on one or more platforms that are currently executable, by using a plurality of application servers that distribute applications based on different platforms, according to an example;

FIG. 15 is a flowchart for explaining a method by which an image forming apparatus installs applications installable on one or more platforms that are currently executable, according to an example; and FIG. 16 is a flowchart for explaining a method by which a server registers an application based on a predetermined platform thereon, generates an installation file for the application, and distributes the application, according to an example.

MODE FOR THE INVENTION

It will be understood that the terms "comprises" and/or "comprising" as used herein specify the presence of stated components, but do not preclude the presence or addition of one or more other components.

It will be understood that, although the terms first, second, third, etc. may be used herein to describe various elements, these elements should not be limited by these terms. These terms are only used to distinguish one element from another element. Thus, a first element discussed below could be termed a second element and, similarly, a second element could be termed a first element without departing from the teachings of the present disclosure. As used herein, the term "and/or" includes any and all combinations of one or more of the associated listed items.

The term "image forming job" used herein may refer to any of various jobs (e.g., printing, copying, scanning, or faxing) related to an image, such as forming an image or generating/storing/transmitting an image file, and the term "job" may refer to not only an image forming job but also a series of processes required to perform the image forming job.

Also, the term "image forming apparatus" may refer to any apparatus capable of performing an image forming job, such as a printer, a copier, a scanner, a fax machine, a multi-function printer (MFP), or a display apparatus.

Also, the term "user" may refer to a person who performs an operation associated with an image forming job by using an image forming apparatus or a device connected by wire or wirelessly to the image forming apparatus. Also, the term "manager" may refer to a person who has access to all functions and systems of the image forming apparatus. The "manager" and the "user" may be the same person.

The term "app," which is an abbreviation of the term application, may refer to an application program running in an electronic device or a smart device.

Expressions such as "at least one of," when preceding a list of elements, modify the entire list of elements and do not modify the individual elements of the list.

Hereinafter, examples of the present disclosure will be described with reference to the accompanying drawings in order to enable one of ordinary skill in the art to easily embody and practice the present disclosure. However, the present disclosure is not limited to the examples disclosed below, but may be implemented in various forms.

The present disclosure will now be described more fully with reference to the accompanying drawings, in which examples of the present disclosure are shown.

FIG. 1 is a block diagram illustrating a configuration of an image forming apparatus according to an example.

Referring to FIG. 1, an image forming apparatus 100 according to an example may include a user interface device 110, a controller 120, a communicator 130, a memory 140, and an image forming job performer 150. Also, although not shown in FIG. 1, the image forming apparatus 100 may further include a power supply unit for supplying power to each of the elements.

The user interface device 110 may include an input unit for receiving an input for performing an image forming job from a user, and an output unit for displaying information such as a result of the image forming job or a state of the image forming apparatus 100. For example, the user interface device 110 may include an operation panel configured to receive a user input and a display panel configured to display a screen.

As an example, the input unit may include any of devices for receiving various types of user inputs, such as a keyboard, physical buttons, a touchscreen, a camera, and a microphone. Also, the output unit may include, for example, a display panel or a speaker. However, the present disclosure is not limited thereto, and the user interface device 110 may include any of devices that support various inputs and outputs.

The controller 120 may control an overall operation of the image forming apparatus 100, and may include at least one processor such as a central processing unit (CPU). The controller 120 may control other elements included in the image forming apparatus 100 to perform an operation corresponding to a user input received through the user interface device 110. The controller 120 may include at least one specialized processor corresponding to each function, or may be one integrated processor.

For example, the controller 120 may execute a program stored in the memory 140, may read data or a file stored in the memory 140, or may store a new file in the memory 140.

The communicator 130 may communicate with another device or a network by wire or wirelessly. To this end, the communicator 130 may include a communication module that supports at least one of various wired/wireless communication methods. For example, the communication module may be in the form of a chipset or a sticker/barcode (e.g., a sticker including a near-field communication (NFC) tag) including information needed for communication.

Wireless communication may include at least one of, for example, Wireless Fidelity (Wi-Fi), Wi-Fi Direct (WFD), Bluetooth, Ultra-wideband (UWB), and NFC. Wired communication may include at least one of, for example, a universal serial bus (USB) and a high-definition multimedia interface (HDMI).

The communicator 130 may be connected to an external apparatus located outside the image forming apparatus 100 and may transmit/receive a signal or data to/from the external apparatus. Referring to FIG. 2, the image forming apparatus 100 is connected to a user terminal 200 through the communicator 130. The communicator 130 may transmit a signal or data received from the user terminal 200 to the controller 120, or may transmit a signal or data generated by the controller 120 to the user terminal 200. For example, when the communicator 130 receives a print command signal or print data from the user terminal 200, the controller 120 may output the received print data through a printer 151.

FIG. 2 is a block diagram illustrating a state in which an image forming apparatus is connected to a user terminal or a server according to an example.

Referring to FIG. 2, the user terminal 200 may include an input/output unit 210, a controller 220, a communicator 230, and a memory 240. The controller 220 may control an image forming job by executing a program stored in the memory 240 and transmitting a signal or data generated as a result of the executed program to the image forming apparatus 100 through the communicator 230. Examples of the user terminal 200 may include a smartphone, a tablet, a personal computer (PC), a home appliance, a medical device, a camera, and a wearable device.

The communicator 130 may be directly connected to a server 300 and may transmit/receive a signal or data to/from the server 300. Also, the communicator 130 may be connected to the user terminal 200 through the server 300. That is, the communicator 130 of the image forming apparatus 100 may transmit/receive a signal or data to/from the communicator 230 of the user terminal 200 through the server 300.

Referring back to FIG. 1, various types of data, such as a file or a program like an application, may be installed and stored in the memory 140. The controller 120 may access the data stored in the memory 140 to use the data, or may store new data in the memory 140. Also, the controller 120 may execute the program installed in the memory 140 and may install an application received from an external source through the communicator 130 in the memory 140.

The image forming job performer 150 may perform an image forming job such as printing, copying, scanning, or faxing.

Although the image forming job performer 150 includes the printer 151, a scanner 152, and a facsimile 153 in FIG. 1, the image forming job performer 150 may include only some of the illustrated elements or may further include other elements for performing another type of image forming job, if necessary.

The printer 151 may form an image on a recording medium by using any of various printing methods such as an electrophotography method, an inkjet method, a thermal transfer method, and a direct thermal method.

The scanner 152 may emit light to a document, may receive reflected light, and may read an image recorded on the document. A charge-coupled device (CCD) or a contact-type image sensor (CIS) may be used as an image sensor for reading the image from the document. The scanner 152 may have a flatbed structure in which the document is located at a fixed position and the image sensor reads the image while moving, a document feed structure in which the image sensor is located at a fixed position and the document is fed, or a complex structure thereof.

The facsimile 153 may share a component for scanning an image with the scanner 152, may share a component for printing a received file with the printer 151, may transmit a scan file to a destination, and may receive a file from an external source.

Names of the elements of the image forming apparatus 100 may be changed. Also, the image forming apparatus 100 may include at least one of the illustrated elements, and some elements may be omitted or other elements may be further included in the image forming apparatus 100.

The user interface device 110 of FIG. 1 may include its own control system. That is, separately from the controller 120 of the image forming apparatus 100, the user interface device 110 may include a control system (e.g., a controller and a memory) for controlling a user interface (UI) provided by the user interface device 110. An operating system (OS) for providing the UI and programs such as applications for supporting various functions may be installed in the control system of the user interface device 110.

FIG. 3 is a block diagram illustrating a configuration of a user interface device according to an example.

Referring to FIG. 3, the user interface device 110 may include an input/output controller 111, a display 112, an operation panel 113, and a memory 114.

As shown in FIG. 3, the user interface device 110 may include a control system (e.g., the input/output controller 111 and the memory 114), separately from the controller 120. The input/output controller 111 and the memory 114 may control a UI provided by the user interface device 110. The input/output controller 111 may include a processor such as a CPU, like the controller 120.

The display 112 may include a liquid crystal display (LCD) panel or an organic light-emitting display (OLED) panel, and the operation panel 113 may include physical buttons or a touchscreen.

The user interface device 110 may be separated from the image forming apparatus 100. For example, the user interface device 110 may operate like a tablet when the user interface device 110 is separated from the image forming apparatus 100, and may perform an input/output function when the user interface device 110 is combined with the image forming apparatus 100. When the user interface device 110 may be separated from the image forming apparatus 100, the user interface device 110 may further include a communicator for performing communication with an external apparatus.

FIG. 4 is a conceptual diagram for explaining a process by which an image forming apparatus that supports a plurality of platforms downloads an application executable on the plurality of platforms from an application server and installs the application, according to an example.

Referring to FIG. 4, an application server 400 may receive information about applications developed by an application developer 11, may register the applications, and may distribute the registered applications. Also, the application server 400 may refer to an online content store where various content application programs may be freely sold and bought.

In order for an application to run in a device, a predetermined platform is needed. The term "platform" may refer to a particular processor model on which a computer system is based and an OS based on one computer system. Also, the term "platform" may refer to an environment in which predetermined software is provided.

As shown in FIG. 4, the application server 400 may include a plurality of applications registered thereon. When a request to download any of the registered applications is received from an external device, the application server 400 may distribute the application. A first application and a second application run only on a first platform, and do not run on platforms other than the first platform. Also, a third application, a fourth application, and a fifth application run only on a second platform, and a sixth application and a seventh application run only on a third platform.

For example, a first image forming apparatus 100-1 may support the first platform and the second platform. Also, the first application executable on the first platform, and the third application and the fourth application executable on the second platform may be installed in the first image forming apparatus 100-1. The first image forming apparatus 100-1 may need a fifth function supported only by the fifth application, according to a predetermined image forming job. The fifth application may run only on the second platform. Accordingly, the first image forming apparatus 100-1 may request the application server 400 for an installation file of the fifth application, and may download the installation file of the fifth application from the application server 400.

For example, a second image forming apparatus 100-2 may support the second platform and the third platform. The fourth application and the fifth application executable on the second platform, and the seventh application executable on the third platform may be installed in the second image forming apparatus 100-2. The second image forming apparatus 100-2 may need a first function supported only by the first application, according to a predetermined image forming job. The second image forming apparatus 100-2 may request the application server 400 for an installation file of the first application. However, since the second image forming apparatus 100-2 does not support the first platform, the application server 400 does not transmit the installation file of the first application to the second image forming apparatus 100-2. In order for the second image forming apparatus 100-2 to install the first application, additional hardware that supports the first platform has to be provided.

For example, a third image forming apparatus 100-3 may support the first platform. The second application executable on the first platform may be installed in the third image forming apparatus 100-3. When the second application needs to be installed, the third image forming apparatus 100-3 may request the application server 400 for an installation file of the second application and may download the installation file of the second application from the application server 400.

That is, when an image forming apparatus supports a plurality of platforms, a user may use various functions and applications supported by the platforms in one image forming apparatus. Also, when one application server 400 registers applications based on a plurality of platforms thereon and distributes the applications, the user may install and use all applications supported by each platform in the application server 400 at once.

Accordingly, there is a need for an image forming apparatus that supports a plurality of platforms and an application server configured to manage applications based on the plurality of platforms. FIGS. 4 through 16 are diagrams for explaining examples of operations of an image forming apparatus that supports a plurality of platforms and an application server that manages applications based on the plurality of platforms.

FIG. 5 is a block diagram illustrating a configuration of an image forming apparatus that supports a plurality of platforms, according to an example.

Referring to FIG. 5, the image forming apparatus 100 may include the user interface device 110, the processor 120, the communicator 130, and the memory 140. However, all of the elements illustrated in FIG. 5 are not essential elements. The image forming apparatus 100 may include more or fewer elements than those illustrated in FIG. 5.

The user interface device 110 of the image forming apparatus 100 of FIG. 5 may correspond to the user interface device 110 of the image forming apparatus 100 of FIG. 1. The processor 120 of the image forming apparatus 100 of FIG. 5 may correspond to the controller 120 of the image forming apparatus 100 of FIG. 1. The communicator 130 of the image forming apparatus 100 of FIG. 5 may correspond to the communicator 130 of the image forming apparatus 100 of FIG. 1. The memory 140 of the image forming apparatus 100 of FIG. 5 may correspond to the memory 140 of the image forming apparatus 100 of FIG. 1.

The user interface device 110 refers to a device that receives data for controlling the image forming apparatus 100 from a user. The processor 120 may control a display of a UI to generate and output a UI screen for receiving a predetermined command or data from the user.

The processor 120 may determine one or more platforms currently executable in the image forming apparatus 100 from among a plurality of platforms supported by the image forming apparatus 100.

The processor 120 may transmit a request for information of one or more applications executable on the determined one or more platforms to an application server. The processor 120 may receive, from the application server, an application list including the information of the one or more applications. Also, the processor 120 may transmit, to the application server, platform information used to determine whether a predetermined application is executable on the one or more platforms.

The processor 120 may display the application list received from the application server on the user interface device 110. The application list may include, but is not limited to, information of a platform on which each of the one or more applications is executable and installation information indicating whether each of the one or more applications is installed in the image forming apparatus 100.

Also, the processor 120 may compare the information of the one or more applications included in the application list with information of one or more applications currently installed in the image forming apparatus 100. The processor 120 may display the application list based on a result of the comparison so that information of one or more applications installable based on the one or more platforms currently executable in the image forming apparatus 100 is distinguished from the information of the one or more applications installed in the image forming apparatus 100.

The processor 120 may determine one or more applications to be installed on the one or more platforms, based on the application list. For example, the user interface device 110 may receive a user input that selects one or more applications to be installed in the application list. The processor 120 may determine the one or more applications to be installed on the one or more platforms, based on the user input received through the user interface device 110.

The processor 120 may download installation files of the one or more applications to be installed from the application server, and may install each of the installation files on an executable platform from among the one or more platforms.

As an example, the processor 120 may obtain profile information of each of the one or more applications to be installed by decompressing each of the installation files of the one or more applications to be installed. The profile information may include information about at least one parameter from among, but not limited to, a type of a platform for executing each of the one or more applications to be installed, and a name, a version, a distributor, a distribution date, and an installation file name of each of the one or more applications to be installed.

Also, the processor 120 may install each of the installation files on an executable platform from among the one or more platforms based on the profile information of each of the one or more applications to be installed.

Also, the processor 120 may update state information of each of the one or more applications in the application list, when each of the installation files of the one or more applications to be installed is installed on the executable platform.

When the application server includes a first application server and a second application server in which a plurality of applications based on different platforms are stored, the processor 120 may transmit an information request for one or more applications executable on a first platform to the first application server. The processor 120 may receive a first application list including information of one or more applications registered on the first application server from the first application server.

Also, the processor 120 may transmit an information request for one or more applications executable on the second platform to the second application server. The processor 120 may receive a second application list including information of one or more applications registered on the second application server from the second application server.

Also, the processor 120 may display an integrated application list obtained by combining the first application list and the second application list on the user interface device 110.

The communicator 130 may receive data from one or more external apparatuses and/or transmit data to the one or more external apparatuses. For example, the communicator 130 may transmit information about applications executable on one or more platforms to the application server, and may receive an application list including information about applications from the application server. Also, the communicator 130 may download installation files of the applications from the application server.

The communicator 130 may be connected to the one or more external apparatuses through a communication network supporting Wi-Fi or WFD. Examples of a wireless communication network to which the communicator 130 may be connected may include, but are not limited to, Wireless LAN, Wi-Fi, Bluetooth, ZigBee, WFD, UWB, Infrared Data Association (IrDA), Bluetooth Low Energy (BLE), and NFC.

The memory 140 may store a program, data, or a file related to the image forming apparatus 100. The processor 120 may execute the program stored in the memory 140, may read the data or the file stored in the memory 140, or may store a new file in the memory 140.

The memory 140 may store an application list received from the application server and an updated application list. Also, the memory 140 may store a result obtained after comparing information of applications included in the application list with information of applications currently installed on a predetermined platform in the image forming apparatus 100. Also, the memory 140 may store an installation file and profile information of each of the applications obtained from the application server.

Also, the memory 140 may store one or more instructions executable by the processor 120. For example, the one or more instructions may include, but are not limited to, an instruction for determining one or more platforms currently executable in the image forming apparatus 100 from among a plurality of platforms, an instruction for transmitting a request for information of one or more applications executable on the determined one or more platforms to the application server and receiving, from the application server, an application list including the information of the one or more applications, an instruction for determining one or more applications to be installed on the one or more platforms based on the application list, and an instruction for downloading each of installation files of the one or more applications to be installed from the application server and installing each of the installation files on an executable platform from among the one or more platforms.

The image forming apparatus 100 may include a central calculation processor (not shown), and may control operations of the user interface device 110, the processor 120, the communicator 130, and the memory 140. The central calculation processor may include an array of logic gates, or a combination of a general-purpose microprocessor and a memory in which a program that may be executed by the microprocessor is stored. Also, it will be understood by one of ordinary skill in the art that the central calculation processor may be another type of hardware.

It will be understood by one of ordinary skill in the art that although each of elements of the image forming apparatus 100 is not specified, each operation or application that may be clearly understood and expected by one of ordinary skill in the art may be understood as typical implementation, and the scope of the present disclosure is not limited by names or physical/logical structures of specific elements.

FIG. 6 is a diagram for explaining a process by which an application developer registers applications on an application server, according to an example.

Referring to FIG. 6, the application server 400 may receive information about applications developed by a plurality of application developers 11, 12, and 13. The application server 400 may include a communicator 401, a processor 402, and a memory 403. However, all of the elements illustrated in FIG. 6 are not essential elements. The application server 400 may include more or fewer elements than those illustrated in FIG. 6.

The communicator 401 of the application server 400 may receive profile information and installation data file information of each application based on a predetermined platform from a device of each of the plurality of application developers 11, 12, and 13. The profile information of the application may include at least one of information from among, but not limited to, a type of a platform for executing the application, a version of the application, a distributor of the application, a distribution date of the application, and an installation file name of the application.

The memory 403 of the application server 400 may register the application on the server, based on the profile information and the installation data file information of the application executable on the predetermined platform.

The processor 402 of the application server 400 may generate an installation file of the application based on the profile information and the installation data file information of the application. A process by which the application server 400 generates an installation file App.hpk of an application will now be explained as an example.

When a platform is Android, the processor 402 of the application server 400 may generate a file App.xml, based on information extracted from profile information of an application and installation data file information of the application. Also, the processor 402 of the application server 400 may generate an installation file App.hpk by combining the file App.xml and a file App.apk indicating the installation data file information. A platform type of the file App.xml may be determined from information obtained by decompressing the file App.apk and an extension of the file App.apk.

For example, when a platform is OXPd, the processor 402 of the application server 400 may generate a file App.xml, based on information extracted from profile information of an application and installation data file information of the application. Also, the processor 402 of the application server 400 may generate an installation file App.hpk by combining the file App.xml and a file App.xml indicating the installation data file information. A platform type of the file App.xml may be determined from information obtained by decompressing the file App.xml and an extension of the file App.xml.

The application server 400 may obtain an installation file App.hpk of an application from an external apparatus. For example, a developer may generate the installation file App.hpk by using an additional HPK file generation tool and may transmit the installation file App.hpk to the application server 400.

As shown in 610 of FIG. 6, the application server 400 may store a "first application" based on a "first platform" distributed by a "first developer" as an installation file "App1.hpk". Also, the application server 400 may store a "second application" based on a "second platform" distributed by a "second developer" as an installation file "App2.hpk". Also, the application server 400 may store a "third application" based on the "first platform" distributed by a "third developer" as an installation file "App3.hpk", and may store a "fourth application" based on a "third platform" as an installation file "App4.hpk". The application server 400 may store installation files of applications in the same format.

FIG. 7 is a diagram for explaining an installation file of an application to be installed in an image forming apparatus, according to an example.

Referring to FIG. 7, an installation file 710, when a platform is Android, may be a compressed file including two files, that is, a file App.xml that stores profile information of an application and a file App.apk that stores an installation data file of the application. The installation file 710 may be stored as App.hpk including the file App.xml and the file App.apk. It will be understood by one of ordinary skill in the art that a file format is not limited thereto and the installation file 710 may be stored in any of other formats.

The file App.xml may include information that is input when the application is registered, and may store at least one of information from among a type of a platform for executing the application, a name of the application, a version of the application, a distributor of the application, a distribution date of the application, and an installation file name of the application.

Also, the installation data file of the application may be used when actually installed on a platform of an external device (e.g., the image forming apparatus 100), and the installation file name is defined in the file App.xml. Also, the installation data file of the application should be the same as the installation file name of the file App.xml. Also, a file format (App.apk) of the installation file name of the file App.xml should be the same as a file format (App.apk) of the installation data file.

As also shown in FIG. 7, an installation file 720, when a platform is OXPd, may be a compressed file including two files, that is, a file App.xml that stores profile information of an application and a file App.xml that stores an installation data file of the application. The installation file 720 may be stored as App.hpk including the file App.xml and the file App.xml.

Similar to the installation file 710, the file App.xml may store at least one of information from among a type of a platform for executing the application, a name of the application, a version of the application, a distribution date of the application, and an installation file name of the application. Also, the installation data file of the application may be used when actually installed on a platform of an external device, and the installation file name is defined in the file App.xml. Also, the installation data file of the application should be the same as the installation file name of the file App.xml. Also, a file format (App.xml) of the installation file name of the file App.xml should be the same as a file format (App.xml) of the installation data file.

FIG. 8 is a diagram for explaining a process by which image forming apparatuses that support a plurality of platforms request an application server for an application list based on one or more platforms that are currently executable and receive the application list from the application server, according to an example.

Referring to FIG. 8, a first application and a second application run only on a first platform, and do not run on platforms other than the first platform. Also, a third platform, a fourth application, and a fifth application run only on a second platform, and a sixth application and a seventh application run only on a third platform.

For example, the first image forming apparatus 100-1 may support the first platform and the second platform. The first image forming apparatus 100-1 may request the application server 400 for a first application list based on the first platform and the second platform currently activated by the first image forming apparatus 100-1. The application server 400 may transmit the first application list including information of applications executable on the first platform and the second platform, according to a first application list request of the first image forming apparatus 100-1. The first image forming apparatus 100-1 may compare the information of the applications in the first application list received from the application server 400 with information of applications installed in the first image forming apparatus 100-1, and may display the first application list based on a result of the comparison so that installed applications and non-installed applications are distinguished from each other according to platforms. Also, the first image forming apparatus 100-1 may display an icon "Install" on an installable application. As shown in FIG. 8, the first image forming apparatus 100-1 may display the icon "Install" to indicate that the second application through the fifth application are installable.

For example, the second image forming apparatus 100-2 may support the second platform and the third platform. The second image forming apparatus 100-2 may request the application server 400 for a second application list based on the second platform and the third platform currently activated by the second image forming apparatus 100-2. The application server 400 may transmit the second application list including information of applications executable on the second platform and the third platform, according to a second application list request of the second image forming apparatus 100-2. The second image forming apparatus 100-2 may compare the information of the applications in the second application list received from the application server 400 with information of applications installed in the second image forming apparatus 100-2, and may display the second application list based on a result of the comparison so that installed applications and non-installed applications are distinguished from each other according to platforms. As shown in FIG. 8, the second image forming apparatus 100-2 may display an icon "Install" to indicate that the third application, the sixth application, and the seventh application are installable.

For example, the third image forming apparatus 100-3 may support the first platform. The third image forming apparatus 100-3 may request the application server 400 for a third application list based on the first platform currently activated by the third image forming apparatus 100-3. The application server 400 may transmit the third application list including information of applications executable on the first platform, according to a third application list request of the third image forming apparatus 100-3. As shown in FIG. 8, the third image forming apparatus 100-3 may display an icon "Install" to indicate that the first application is installable.

FIG. 9 is a diagram for explaining a process by which an image forming apparatus that supports a plurality of platforms determines an application to be installed in an application list and installs the application in the image forming apparatus, according to an example.

Referring to FIGS. 8 and 9, the first image forming apparatus 100-1 may display an application list on the user interface device 110, and may receive an input that selects an icon "Install" for installing a second application in the application list. The first image forming apparatus 100-1 may request the application server 400 for an installation file "App2.hpk" of the second application, and may download the installation file "App2.hpk" from the application server 400.

The processor 120 of the first image forming apparatus 100-1 may obtain a file App2.xml indicating profile information of the second application by decompressing the installation file "App2.hpk". The processor 120 of the first image forming apparatus 100-1 may determine whether the second application may be installed on a first platform by checking the profile information in the file App2.xml. When it is determined that the second application may be installed on the first platform, the processor 120 of the first image forming apparatus 100-1 may transmit a file App2.apk indicating an installation data file of the second application to the first platform and may install the second application on the first platform.

When the second application is installed, the user interface device 110 of the first image forming apparatus 100-1 may generate and display an icon of the second application on the first platform. Also, the first image forming apparatus 100-1 may change "Available" indicating a state of the second application in the application list to "Installed" and may remove the icon "Install."

FIG. 10 is a diagram for explaining a process by which an image forming apparatus that supports a plurality of platforms obtains and displays an application list installable on one or more platforms that are currently executable, according to an example.

Referring to FIG. 10, the application server 400 may register one or more applications developed by an application developer thereon in operation S1010. Also, the application server 400 may generate installation files of the registered one or more applications.

In operation S1020, the image forming apparatus 100 may determine one or more platforms currently executable in the image forming apparatus 100 from among a plurality of platforms.

In operation S1030, the image forming apparatus 100 may request the application server 400 for an application list based on the one or more platforms executable in the image forming apparatus 100.

In operation S1040, the application server 400 may search for applications based on the one or more platforms executable in the image forming apparatus 100 from among the one or more applications registered on the application server 400.

In operation S1050, the application server 400 may transmit the application list based on the one or more platforms executable in the image forming apparatus 100 to the image forming apparatus 100.

In operation S1060, the image forming apparatus 100 may compare applications included in the application list with applications installed in the image forming apparatus 100.

In operation S1070, the image forming apparatus 100 may display an application list including information of applications installable in the image forming apparatus 100, based on a result of the comparison.

FIG. 11 is a diagram for explaining a process by which an image forming apparatus that supports a plurality of platforms determines an application to be installed and installs the application, based on an application list, according to an example.

Referring to FIG. 11, the image forming apparatus 100 may determine an application to be installed in the image forming apparatus 100, based on an application list in operation S1110.

In operation S1120, the image forming apparatus 100 may request the application server 400 for an installation file of the application to be installed.

In operation S1130, the application server 400 may search for the installation file of the application to be installed in the application server 400 according to an installation file request for the application to be installed, and may transmit the obtained installation file to the image forming apparatus 100.

In operation S1140, the image forming apparatus 100 may obtain profile information of the application to be installed by decompressing the received installation file.

In operation S1150, the image forming apparatus 100 may determine whether the application to be installed is supported by platforms currently activated by the image forming apparatus 100, based on the profile information of the application to be installed.

In operation S1160, when it is determined that the application to be installed is supported by the platforms currently activated by the image forming apparatus 100, the image forming apparatus 100 may install the installation file of the application to be installed on a supported platform from among the activated platforms. That is, the image forming apparatus 100 may install the installation file of the application to be installed on an installable platform.

In operation S1170, when the application to be installed is installed, the image forming apparatus 100 may update the application list.

FIG. 12 is a diagram for explaining a process by which an image forming apparatus that supports a plurality of platforms requests a plurality of application servers, which distribute applications based on different platforms, for an application list based on one or more platforms that are currently executable and receives the application list from the plurality of application servers, according to an example.

Referring to FIG. 12, a first application and a second application run only on a first platform, and do not run on platforms other than the first platform. Also, a third application, a fourth application, and a fifth application run only on a second platform. Also, applications based on the first platform are supported only by a first application server 400-1, and applications based on the second platform are supported only by a second application server 400-2.

The first image forming apparatus 100-1 may support the first platform and the second platform. In order to download applications based on the first platform, the first image forming apparatus 100-1 may be connected to the first application server 400-1, and in order to download applications based on the second platform, the first image forming apparatus 100-1 may be connected to the second application server 400-2.

That is, the first image forming apparatus 100-1 may request the first application server 400-1 for a first application list based on the first platform. The first application server 400-1 may transmit the first application list including information of applications executable on the first platform, according to a first application list request of the first image forming apparatus 100-1. The first image forming apparatus 100-1 may compare the information of the applications in the first application list received from the first application server 400-1 with information of applications installed on the first platform in the first image forming apparatus 100-1, and may display the first application list based on a result of the comparison so that applications installed on the first platform are distinguished from applications not installed on the first platform. As shown in FIG. 12, the first image forming apparatus 100-1 may display an icon "Install" on the first application list to indicate that the second application is installable.

Also, the first image forming apparatus 100-1 may request the second application server 400-2 for a second application list based on the second platform. The second application server 400-2 may transmit the second application list including information of applications executable on the second platform, according to a second application list request of the first image forming apparatus 100-1. The first image forming apparatus 100-1 may compare the information of the applications in the second application list received from the second application server 400-2 with information of applications installed on the second platform in the first image forming apparatus 100-1, and may display the second application list based on a result of the comparison so that applications installed on the second platform are distinguished from applications not installed on the second platform. As shown in FIG. 12, the first image forming apparatus 100-1 may display an icon "Install" on the second application list to indicate that the third application through the fifth application are installable.

FIG. 13 is a diagram for explaining a process by which an image forming apparatus that supports a plurality of platforms determines an application to be installed in an application list and installs the application in the image forming apparatus, by using a plurality of application servers that distribute applications based on different platforms, according to an example.

Referring to FIGS. 12 and 13, the first image forming apparatus 100-1 may display a first application list on the user interface device 110, and may receive an input that selects an icon "Install" for installing a second application in the first application list. The first image forming apparatus 100-1 may request the first application server 400-1 for an installation file "App2.hpk" of the second application, and may download the installation file "App2.hpk" from the first application server 400-1.

The processor 120 of the first image forming apparatus 100-1 may obtain a file App2.xml indicating profile information of the second application by decompressing the installation file "App2.hpk". The processor 120 of the first image forming apparatus 100-1 may determine whether the second application may be installed on a first platform by checking the profile information in the file App2.xml. When it is determined that the second application may be installed on the first platform, the processor 120 of the first image forming apparatus 100-1 may transmit a file App2.apk indicating an installation data file of the second application to the first platform, and may install the second application on the first platform.

When the second application is installed, the user interface device 110 of the first image forming apparatus 100-1 may generate and display an icon of the second application on the first platform. Also, the first image forming apparatus 100-1 may change "Available" indicating a state of the second application in the first application list to "Installed", and may remove the icon "Install."

That is, when application servers are distributed and managed according to platforms, the first image forming apparatus 100-1 may request an application server that distributes applications based on activated platforms for an application list, and may receive the application list. When an application to be downloaded is determined based on the application list, the first image forming apparatus 100-1 may request the application server that transmits the application list to transmit an installation file of the application to be downloaded.

FIG. 14 is a diagram for explaining a process by which an image forming apparatus that supports a plurality of platforms installs applications installable on one or more platforms that are currently executable, by using a plurality of application servers that distribute applications based on different platforms, according to an example.

Referring to FIG. 14, the image forming apparatus 100 may determine a first platform and a second platform currently executable in the image forming apparatus 100 from among a plurality of platforms in operation S1410.

In operation S1420, the image forming apparatus 100 may request the first application server 400-1 for a first application list of applications based on the first platform.

In operation S1424, the first application server 400-1 may search for the applications based on the first platform from among one or more applications registered on the first application server 400-1.

In operation S1428, the first application server 400-1 may transmit the first application list of the applications based on the first platform to the image forming apparatus 100.

In operation S1430, the image forming apparatus 100 may request a second application server 400-2 for a second application list of applications based on the second platform.

In operation S1434, the second application server 400-2 may search for the applications based on the second platform from among one or more applications registered on the second application server 400-2.

In operation S1438, the second application server 400-2 may transmit the second application list of the applications based on the second platform to the image forming apparatus 100.

It will be understood by one of ordinary skill in the art that the image forming apparatus 100, the first application server 400-1, and the second application server 400-2 may not operate in an order from operations S1420 to S1438 and may operate in an order different from the described order.

In operation S1440, the image forming apparatus 100 may display the first application list and the second application list on the user interface device 110, and may determine that the first application in the first application list is to be installed.

In operation S1450, the image forming apparatus 100 may request the first application server 400-1 for an installation file of the first application in the first application list.

In operation S1460, the first application server 400-1 may transmit the installation file of the first application to the image forming apparatus 100.

In operation S1470, the image forming apparatus 100 may install the first application based on the first platform in the image forming apparatus 100 by using the installation file of the first application.

FIG. 15 is a flowchart for explaining a method by which an image forming apparatus installs applications installable on one or more platforms that are currently executable, according to an example.

Referring to FIG. 15, the image forming apparatus 100 may determine one or more platforms currently executable in the image forming apparatus 100 from among a plurality of platforms in operation S1510.

In operation S1520, the image forming apparatus 100 may transmit a request for information of one or more applications executable on the determined one or more platforms to the application server 400. Also, the image forming apparatus 100 may transmit platform information used to determine whether a predetermined application is executable on the one or more platforms to the application server 400. Also, the image forming apparatus 100 may receive an application list including the information of the one or more applications from the application server 400.

In operation S1530, the image forming apparatus 100 may determine one or more applications to be installed on the one or more platforms, based on the application list. The image forming apparatus 100 may display the application list received from the application server 400 on a user interface device. The application list may include information of a platform on which each of the one or more applications is executable and installation information indicating whether each of the one or more applications is currently installed in the image forming apparatus 100.

Also, the image forming apparatus 100 may compare the information of the one or more applications included in the application list with information of one or more applications currently installed in the image forming apparatus 100. The image forming apparatus 100 may display the application list based on a result of the comparison so that information of one or more applications installable based on the one or more platforms currently executable in the image forming apparatus 100 is distinguished from the information of the one or more applications installed in the image forming apparatus 100.

Also, the image forming apparatus 100 may determine one or more applications to be installed, by receiving a user input that selects the one or more applications to be installed in the application list displayed on the user interface device.

In operation S1540, the image forming apparatus 100 may download installation files of the one or more applications to be installed from the application server 400. Also, the image forming apparatus 100 may install each of the installation files on an executable platform from among the one or more platforms.

Also, the image forming apparatus 100 may obtain profile information of each of the one or more applications to be installed by decompressing each of the installation files of the one or more applications to be installed. The profile information may include information about at least one parameter from among, but not limited to, a type of a platform for executing each of the one or more applications to be installed, and a name, a version, a distributor, a distribution date, and an installation file name of each of the one or more applications to be installed.

The image forming apparatus 100 may install each of the installation files on an executable platform from among the one or more platforms, based on the profile information of each of the one or more applications to be installed.

Also, when each of the installation files of the one or more applications to be installed is installed on the executable platform, the image forming apparatus may update state information of each of the one or more applications in the application list.

When the application server 400 includes the first application server 400-1 and the second application server 400-2 in which a plurality of applications based on different platforms are stored, the image forming apparatus 100 may transmit an information request for one or more applications executable on a first platform to the first application server 400-1. The image forming apparatus 100 may receive a first application list including information of one or more applications registered on the first application server 400-1 from the first application server 400-1.

Also, the image forming apparatus 100 may transmit an information request for one or more applications executable on a second platform to the second application server 400-2. The image forming apparatus 100 may receive a second application list including information of one or more applications registered on the second application server 400-2 from the second application server 400-2.

Also, the image forming apparatus 100 may display an integrated application list obtained by combining the first application list and the second application list on the user interface device.

FIG. 16 is a flowchart for explaining a method by which a server registers an application based on a predetermined platform thereon, generates an installation file of the application, and distributes the application, according to an example.

Referring to FIG. 16, a server may register one or more applications that are executable on a predetermined platform on the server, based on profile information and installation data file information of each of the registered one or more applications in operation S1610.

In operation S1620, the server may generate installation files of the registered one or more applications, based on the profile information and the installation data file information of each of the registered one or more applications.

In operation S1630, the server may receive a request for an application list based on the predetermined platform from an external device. The server may obtain the application list by searching for the one or more applications based on the predetermined platform from among one or more applications registered on the server. The server may transmit the application list to the external device.

In operation S1640, the server may receive a request for an installation file of an application to be installed in the application list from the external device. The server may search for the installation file of the application to be installed from among the installation files of the one or more applications registered on the server, and may transmit the installation file to the external device. For example, when a request to download a first application executable on the predetermined platform supported by the external device is received from the external device, the server may search for an installation file of the first application from among the installation files of the one or more applications registered on the server and may transmit the installation file to the external device.

An image forming apparatus may be realized in the form of a hardware component, a software component, and/or a combination of a hardware component and a software component. For example, the apparatus and corresponding components according to the above-described examples may be realized by using at least one or more universal computers or special-purpose computers, such as a processor, a controller, an arithmetic logic unit (ALU), a digital signal processor, a microcomputer, a field-programmable array (FPA), a programmable logic unit (PLU), a microprocessor, or any type of device that may execute and respond to an instruction (or command).

The present disclosure may be embodied as a recording medium including instructions that may be executed in computers, e.g., a program module executed in computers. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While one or more examples of the present disclosure have been described with reference to the drawings, it will be understood by one of ordinary skill in the art that various changes in form and details may be made therein. For example, the above-described techniques may be executed in an order different from that described in the description of the present disclosure, and/or the components of the above-described system, structure, equipment (or device), circuit, and so on, may be combined in a format different that of the above-described method according to the present disclosure, and an adequate result may be achieved even if the above-described components of the present disclosure are replaced by any other components or equivalents.

Therefore, the scope of the present disclosure is defined not by the above examples but by the appended claims and equivalents of the claims.

The invention claimed is:

1. An image forming apparatus comprising:
a communicator;
a user interface device;
a memory to store one or more instructions; and
a processor to execute the one or more instructions stored in the memory, wherein the processor, by executing the one or more instructions, is to:
  determine a first platform and a second platform currently executable in the image forming apparatus,
  transmit, to an application server, a request for information of one or more applications executable on the first platform and information of one or more applications executable on the second platform, and receive, from the application server, an application list including the information of the one or more applications executable on the first platform and the information of the one or more applications executable on the second platform,
  compare the information of the one or more applications included in the application list with information of one or more applications currently installed in the image forming apparatus,
  display the application list on the user interface device based on a result of the comparison so that information of one or more applications installable on the first platform and information of one or more applications installable on the second platform is distinguished from the information of the one or more applications installed in the image forming apparatus, determine one or more applications to be installed on the first platform or the second platform based on the displayed application list, and download, from the application server, installation files of the one or more applications to be installed and install the installation files.

2. The image forming apparatus of claim 1, wherein the processor, by executing the one or more instructions, is to transmit, to the application server, platform information used to determine whether a predetermined application is executable on the first platform or the second platform.

3. The image forming apparatus of claim 1, wherein the application list comprises information of a platform on which each of the one or more applications is executable and installation information indicating whether each of the one or more applications is installed in the image forming apparatus.

4. The image forming apparatus of claim 3, wherein the processor, by executing the one or more instructions, is to receive a user input that selects the one or more applications to be installed in the application list displayed on the user interface device.

5. The image forming apparatus of claim 1, wherein the processor, by executing the one or more instructions, is to:
obtain profile information of the one or more applications to be installed by decompressing each of the installation files of the one or more applications to be installed, and
install each of the installation files on an executable platform from among the first platform and the second platform based on the profile information of each of the one or more applications to be installed.

6. The image forming apparatus of claim 5, wherein the profile information comprises information about at least one parameter from among a type of a platform for executing each of the one or more applications to be installed, and a name, a version, a distributor, a distribution date, or an installation file name of each of the one or more applications to be installed.

7. The image forming apparatus of claim 1, wherein the processor, by executing the one or more instructions, is to update state information of each of the one or more applications in the application list when each of the installation files of the one or more applications to be installed is installed on the executable first or second platform.

8. The image forming apparatus of claim 1, wherein, when the application server comprises a first application server and a second application server in which a plurality of applications based on different platforms are stored, the processor, by executing the one or more instructions, is to:
transmit, to the first application server, the information request for one or more applications executable on the first platform, and receive, from the first application server, a first application list comprising information of one or more applications registered on the first application server, and
transmit, to the second application server, the information request for one or more applications executable on the second platform, and receive, from the second application server, a second application list comprising information of one or more applications registered on the second application server.

9. The image forming apparatus of claim 8, wherein the processor, by executing the one or more instructions, is to display an integrated application list obtained by combining the first application list and the second application list on the user interface device.

10. A non-transitory computer-readable recording medium having recorded thereon instructions for executing, in a computer, an operation method of an image forming apparatus, the non-transitory computer-readable recording medium comprising:
instructions to determine a first platform and a second platform currently executable in the image forming apparatus;
instructions to transmit, to an application server, a request for information of one or more applications executable on the first platform and information of one or more applications executable on the second platform, and
instructions to receive, from the application server, an application list comprising the information of the one or more applications executable on the first platform and the information of the one or more applications executable on the second platform;
instructions to compare the information of the one or more applications included in the application list with information of one or more applications currently installed in the image forming apparatus;
instructions to display the application list on a user interface device based on a result of the comparison so that information of one or more applications installable on the first platform and information of one or more applications installable on the second platform is distinguished from the information of the one or more applications installed in the image forming apparatus;
instructions to determine one or more applications to be installed on the first platform or the second platform, based on the displayed application list; and
instructions to download, from the application server, installation files of the one or more applications to be installed, and instructions to install the installation files.

11. The non-transitory computer-readable recording medium of claim 10, wherein the instructions to transmit, to the application server, comprise instructions to transmit platform information used to determine whether a predetermined application is executable on the first platform or the second platform.

12. The non-transitory computer-readable recording medium of claim 10,
wherein the application server comprises information of a platform on which each of the one or more applications is executable and installation information indicating whether each of the one or more applications is installed in the image forming apparatus.

13. The non-transitory computer-readable recording medium of claim 12, further comprising instructions to receive a user input that selects the one or more applications to be installed in the application list displayed on the user interface device.

14. The non-transitory computer-readable recording medium of claim 10, further comprising:
instructions to obtain profile information of the one or more applications to be installed by decompressing each of the installation files of the one or more applications to be installed; and
instructions to install each of the installation files on an executable platform from among the first platform and the second platform based on the profile information of each of the one or more applications to be installed.

15. The non-transitory computer-readable recording medium of claim 14, wherein the profile information comprises information about at least one parameter from among a type of a platform for executing each of the one or more applications to be installed, and a name, a version, a distributor, a distribution date, or an installation file name of each of the one or more applications to be installed.

16. The non-transitory computer-readable recording medium of claim 10, further comprising instructions to update state information of each of the one or more applications in the application list when each of the installation files of the one or more applications to be installed is installed on the executable first or second platform.

17. The non-transitory computer-readable recording medium of claim 10, further comprising, when the application server comprises a first application server and a second application server in which a plurality of applications based on different platforms are stored:

instructions to transmit, to the first application server, the information request for one or more applications executable on the first platform, and receive, from the first application server, a first application list comprising information of one or more applications registered on the first application server; and instructions to transmit, to the second application server, the information request for one or more applications executable on the second platform, and receive, from the second application server, a second application list comprising information of one or more applications registered on the second application server.

18. The non-transitory computer-readable recording medium of claim 17, further comprising instructions to display an integrated application list obtained by combining the first application list and the second application list on the user interface device.

* * * * *